United States Patent [19]

Allen

[11] Patent Number: 5,231,793
[45] Date of Patent: Aug. 3, 1993

[54] TREE RING

[76] Inventor: Charles R. Allen, 21443 Sheldon Ave., Port Charlotte, Fla. 33952

[21] Appl. No.: 913,172

[22] Filed: Jul. 14, 1992

[51] Int. Cl.⁵ ............................................. A01G 17/00
[52] U.S. Cl. ........................................................ 47/25
[58] Field of Search ............................ 47/25 R, 25 RS

[56] References Cited

U.S. PATENT DOCUMENTS

| 1,931,602 | 10/1933 | Colman | 47/25 |
| 5,058,317 | 10/1991 | McMurtrey | 47/25 |
| 5,085,001 | 2/1992 | Crawley | 47/25 |

FOREIGN PATENT DOCUMENTS 2615688  12/1988  France .................................... 47/25
1381679   1/1975  United Kingdom ............... 47/25 R Primary Examiner—Carl D. Friedman
Assistant Examiner—Joanne C. Downs
Attorney, Agent, or Firm—Frank A. Lukasik

[57] ABSTRACT

A tree ring and artificial ground covering for protecting the bark on the trunk portion of a tree from the girdling action of lawn trimming equipment, and for inhibiting the growth of undesired vegetation comprising a tubular plastic ring having a groove formed therein, a plastic connector for connecting the two ends of the ring, a water permeable woven plastic material, slit to fit around a tree trunk and fastened to the plastic ring by inserting the edge of the material into the ring groove and holding the material in place with a tubular plastic spline dimensioned to fit within the groove.

6 Claims, 2 Drawing Sheets

TREE RING

BACKGROUND OF THE INVENTION

1. Field of the Invention

This invention relates generally to tree protectors and more particularly to a ring and a fabric for protecting the trunks of trees from the widespread use of nylon line trimmers and the damage caused by lawnmowers and to prevent the undesired growth of grass, weeds and the like in the region immediately adjacent the trunks of growing trees.

2. Description of the Prior Art

Devices intended to protect the trunks of young trees, in particular, from vermin and other pests are not in themselves new. Early devices of this kind are known, which are formed from clay pipe half sections which are not held together at all or are held together by a metal band. Later devices have utilized metal or plastic cylinders. One such device utilized a watering system as disclosed in U.S. Pat. No. 4,268,992 to Scharf et al. U.S. Pat. No. 1,453,810 to Sleen discloses a tree protector having its outer edge formed from a single strand of wire and a closely woven wire mesh or heavy fabric which is sufficiently porous to allow water to pass through, secured to the wire edge.

U.S. Pat. No. 3,571,972 to Carter, Jr. discloses a protective ground collar formed of flexible water resistant sheet material having a main opening formed therein from which a main slit extends to the outer edge of the sheet material to facilitate envelopment of a tree trunk. A plurality of radial inner slits are formed to define a plurality of flexible fingers which are disposed against the tree trunk to inhibit plant growth. U.S. Pat. No. 3,727,347 to Barnes discloses an artificial grass-like covering for the ground around a tree which includes a mat with ends held together in abutting edge-to-edge engagement by a staple which also serves to anchor the mat to the ground thus forming an unbroken ring of artificial grass completely around the base of the tree.

U.S. Pat. No. 5,058,317 to McMurtrey discloses a mulch collar comprising a web of relatively thin, pliable material having an opening for accommodating the stem of a plant and a slit extending from the opening to a peripheral edge of the web. An elongate, flexible member formed into a ring is attached to the web, and two ends are adjacent to each other. The ring is attached to the web so that the opening through the web is located within the ring. The collar may be installed about a plant by spreading the first and second ends of the flexible member apart so as to form a gap between the first and second edges of the slit, and pulling the collar around the plant so that the stem of the plant passes through the gap and into the opening in the web.

Each of the above described products may have some beneficial effect under certain circumstances. As noted, however, each of the products also has certain deficiencies in terms of expense and efficiency of installation. Accordingly, what is needed is an inexpensive tree protector and ground covering which can be quickly installed with a minimum of labor and parts, and which can be left permanently installed about the tree as it grows.

SUMMARY OF THE INVENTION

The general object of the present invention is to provide a tree ring and an artificial ground covering which can be installed around a tree very quickly and easily. Undesired growth of grass, weeds and the like in the region immediately adjacent the trunks of growing trees, fence posts and other upright elements is both unsightly and cannot be controlled with facility due to the fact that ordinary mowers and other cutting devices cannot efficiently cut such undesired growth.

According to this invention, a ring is provided for disposition about the trunks of growing trees, bushes, fence posts and other upright elements and effectively inhibits the growth of undesired vegetation in the region immediately adjacent trees, fence posts and the like. This result is accomplished by providing a plastic ring supporting a fabric material having a slit therein for accommodating the trunk of a tree or other vertical upright element. The two ends of the plastic ring are connected together to complete the ring around the tree. The ring may then be secured to the ground with steel spikes.

An important object of the invention is to provide a guard of this character which may be readily and easily positioned around the trunk of a tree.

Another object of the invention is to provide a tree guard of this character which is of low cost, decorative and long lasting.

Still another object of the invention is to provide a tree guard comprising a ring made of tubular plastic holding a water permeable material around the trunk of a tree.

Still other objects reside in the combinations of elements, arrangement of parts, and features of construction, all as will be more fully pointed out hereinafter and shown in the accompanying drawings, wherein there is disclosed a preferred embodiment of this inventive concept.

DETAILED DESCRIPTION OF THE PREFERRED EMBODIMENT

The present invention contemplates a protective, and decorative ring and an artificial ground cover positioned about the trunk of a tree to protect the tree from damage caused by lawnmowers and also to inhibit the growth of undesired vegetation in the region immediately adjacent trees, fence posts and the like.

Figure 1:
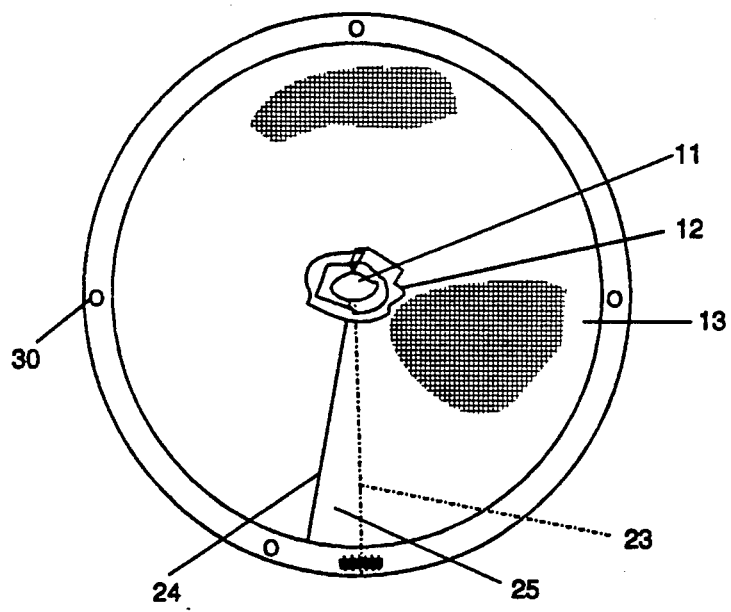
FIG. 1 is a top plan view of a tree ring, constructed in accordance with the invention.
Figure 4:
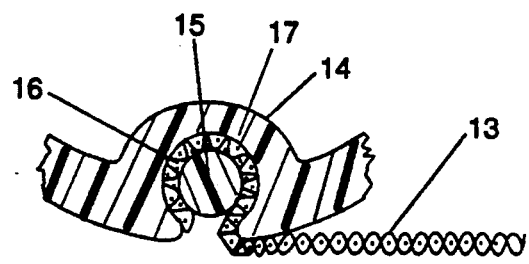
FIG. 4 is a sectional view of an assembly of a spline and fabric inserted in the ring groove taken on line 4—4 of FIG. 2.
Figure 3:
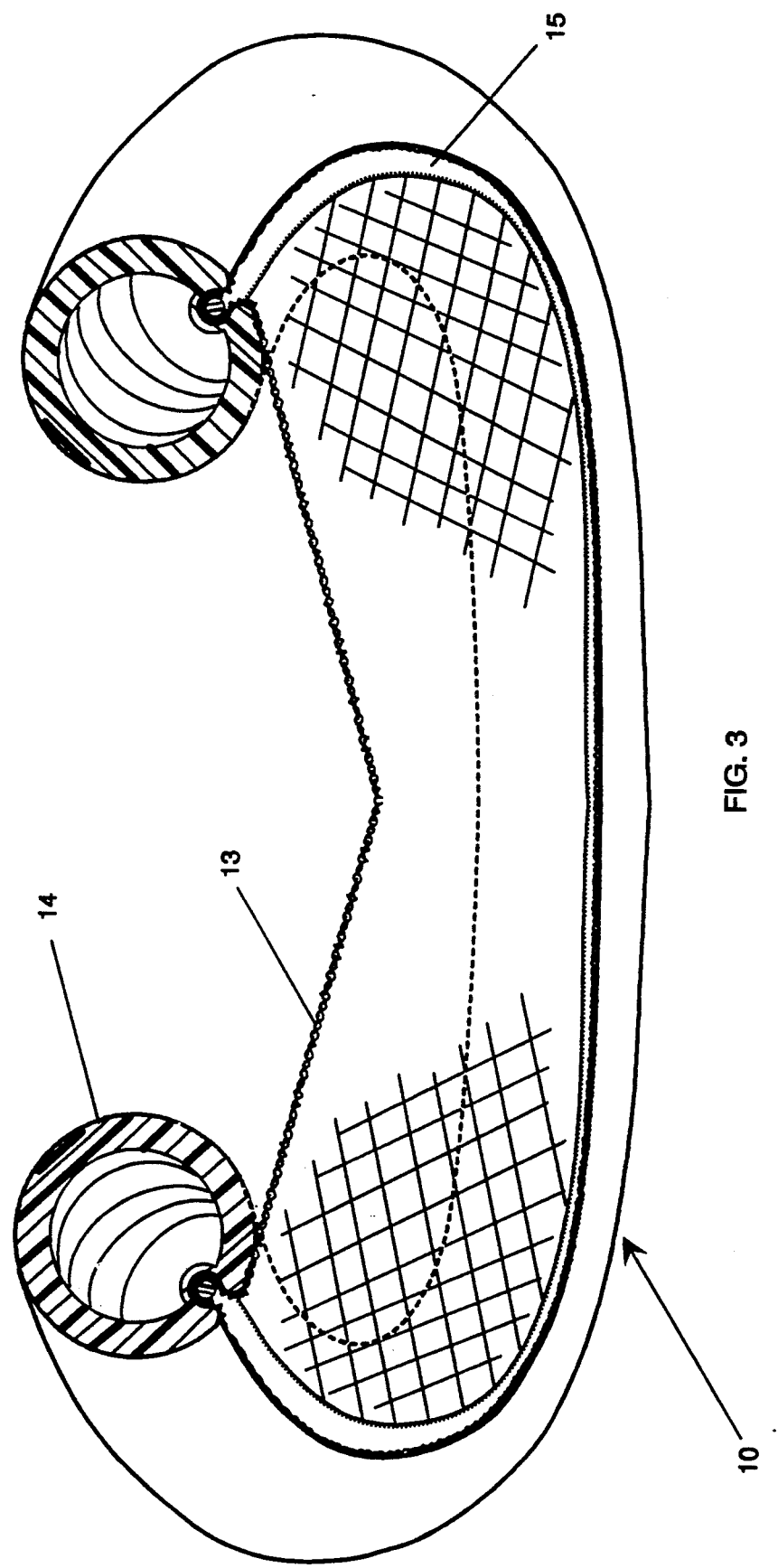
FIG. 3 is a bottom perspective view, partly in section, of a tree ring constructed in accordance with the invention.

FIG. 1 is a top plan view of a tree ring constructed in accordance with the invention and is illustrated generally as 10. In FIG. 1, tree ring 10 is positioned around the trunk of a tree 11, resting on the ground, from which the tree 11 is growing. The trunk of the tree 11 projects through central opening 12 in water permeable material 13 (landscape fabric). Material 13 is attached to tubing 14 by inserting spline 15 and the edge 16 of material 13 into pipe groove 17 as shown on line 4—4 of FIG. 2. The two ends 18 and 19 of tubing 14 are connected together by connector 20 inserted into each of the ends 18 and 19. Connector 20 may comprise a short section of plastic rod or tube with ridges 21 formed on the outside diameter to provide a frictional fit with the interior diameter of tubing 14.

In the embodiment of the tree ring 10, shown in FIGS. 1-4, material 13 comprises a woven polypropylene material which is preferably black and is used to prevent light from reaching the ground. Material 13 is woven sufficiently close to permit water and air to pass through, (permeable) while also preventing weeds or grass from penetrating and growing through the material. The woven material 13 provides tree ring 10 with the advantages of providing very even distribution of water to, and ventilation of, the ground beneath the tree ring 10 without the need for perforating the material while still preventing light from reaching the ground.

In a preferred embodiment, tubing 14 was constructed from plastic, polyethylene tubing, with groove 17 formed therein during extrusion. Another alternative construction would comprise a plastic pipe with a slit cut into the interior diameter to permit the assembly of the spline 15 and the edge 16 of material 13 to form the tree ring 10. The tree ring 10 of the invention may preferably be assembled from a tubing 14 with an outside diameter between 1 inch and 1½ inches and a diameter of the tree ring 10 between 44 and 46 inches.

The spline 15 of the invention may comprise a sufficient length of plastic rod or tube dimensioned to provide a tight fit when assembled with the material 13 in groove 17. The spline 15 would be cut to a sufficient length to match the length of the tubing 14.

Figure 2:
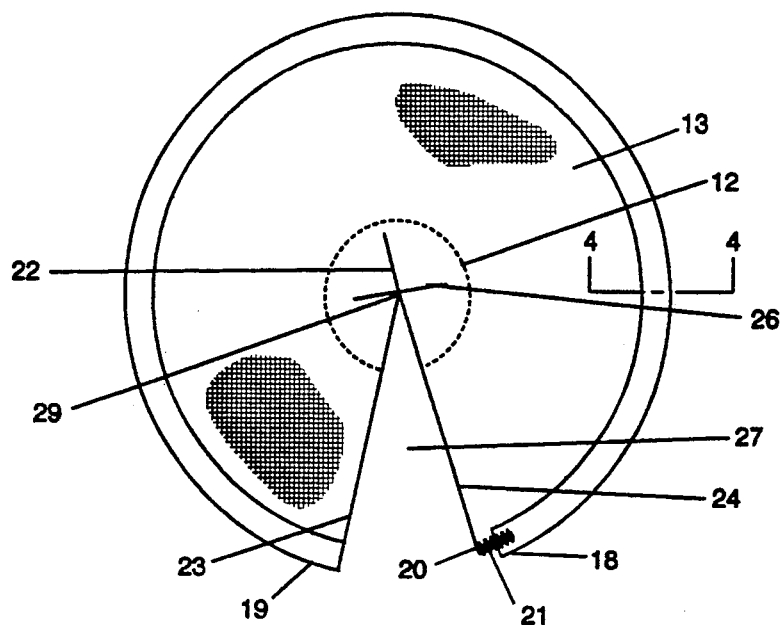
FIG. 2 is a top plan view of a tree ring, in an open position prior to installation around a tree.

FIG. 2 shows a top plan view of the tree ring 10 in an open position prior to installation around a tree. Material 13 contains a first slit 22 which extends from a position beyond the center 29 to the edge 16 forming two material ends 23 and 24. End 24 is shown extending beyond tube end 19 to provide an overlap 25 when assembled as shown in FIG. 1. A second slit 26, intersecting first slit 22, may be used to form an opening 12 to fit around trunk 11. The slits 22 and 26 may be lengthened to expand the opening 27 or to provide a guide for cutting a circular opening 12 to provide a neater appearance.

After assembly of the tree ring 10 around a tree trunk 12, the assembly may be fastened to the ground with four, six inch galvanized steel spikes 30. When the tree ring 10 is fixed in place, it also provides an attractive, decorative ring to dress up the appearance of the lawn.

Having described the invention in its preferred embodiment, it will be clear that modifications can be made without departing from the spirit of the invention. It is not intended that the words used to describe the invention nor the drawings illustrating the same be limiting on the invention but rather, it is intended that the invention only be limited by the scope of the appended claims.

I claim:

1. A tree ring and artificial ground covering for protecting the bark on the trunk portion of a tree from the girdling action of lawn trimming equipment, and for inhibiting the growth of undesired vegetation, said tree ring comprising:
    a tubular ring having a first and a second end and a groove formed therein,
    water permeable material, circularly shaped, and having a first slit extending from beyond the center of said material to the circular outer edge of said material, said first slit having a first and second end, a second slit intersecting said first slit at the center of said material and thereby forming an opening for said trunk portion,
    connector means for joining said first and second ends of said tubular ring, and
    a tubular spline having the same length as said tubular plastic ring and dimensioned to fit within said groove, said spline being inserted with said material, outer edge within said groove, and, said first end of said first slit overlapping said second end.

2. A tree ring and artificial ground covering for protecting the bark of a tree as described in claim 1, wherein said tubular ring, said material, said connector means and said tubular spline consist of plastic.

3. A tree ring and artificial ground covering for protecting the bark of a tree as described in claim 2, wherein said material consists of polypropylene.

4. A tree ring and artificial ground covering for protecting the bark of a tree as described in claim 1 wherein said ring is fastened to the ground with galvanized steel spikes.

5. A tree ring and artificial ground covering for protecting the bark of a tree as described in claim 1 wherein said tubular ring consists of extruded plastic.

6. A tree ring and artificial ground covering for protecting the bark on the trunk portion of a tree from the girdling action of lawn trimming equipment, and for inhibiting the growth of undesired vegetation, said tree ring comprising:
    an extruded plastic tubular ring having a first and a second end and a groove formed therein,
    a polypropylene plastic woven material, circularly shaped, and having a first slit extending from beyond the center of said material to the circular outer edge of said material, said first slit having a first and second end, a second slit intersecting said first slit at the center of said material and thereby forming an opening for said trunk portion,
    a tubular plastic connector for joining said first and second ends of said tubular ring,
    a plastic tubular spline having the same length as said tubular plastic ring and dimensioned to fit within said groove, said spline being inserted with said material outer edge within said groove, and, said first end of said first slit overlapping said second end, and
    a plurality of galvanized steel spikes for fastening said tree ring to the ground.

* * * * *